United States Patent
Adams et al.

(10) Patent No.: US 10,013,674 B2
(45) Date of Patent: *Jul. 3, 2018

(54) ELECTRONIC MESSAGING CHANGED RECIPIENTS DETECTION AND NOTIFICATION

(75) Inventors: Neil Adams, Waterloo (CA); Michael S. Brown, Kitchener (CA); George Babu, Etobicoke (CA)

(73) Assignee: BlackBerry Limited, Waterloo (CA)

( * ) Notice: Subject to any disclaimer, the term of this patent is extended or adjusted under 35 U.S.C. 154(b) by 1224 days.

This patent is subject to a terminal disclaimer.

(21) Appl. No.: 11/457,303

(22) Filed: Jul. 13, 2006

(65) Prior Publication Data

US 2007/0073871 A1    Mar. 29, 2007

Related U.S. Application Data

(60) Provisional application No. 60/720,054, filed on Sep. 26, 2005.

(51) Int. Cl.
| | |
|---|---|
| G06F 15/16 | (2006.01) |
| G06Q 10/10 | (2012.01) |
| H04L 12/58 | (2006.01) |
| H04W 4/12 | (2009.01) |

(Continued)

(52) U.S. Cl.
CPC .......... *G06Q 10/107* (2013.01); *H04L 51/16* (2013.01); *H04L 51/24* (2013.01); *H04L 51/34* (2013.01); *H04L 51/38* (2013.01); *H04L 51/28* (2013.01); *H04W 4/12* (2013.01); *H04W 8/26* (2013.01); *H04W 68/00* (2013.01)

(58) Field of Classification Search
CPC .............. G06Q 10/107; H04L 12/5885; H04L 12/5895; H04L 51/16; H04L 51/24; H04L 51/28; H04L 4/12; H04L 8/26; H04L 68/00
USPC ......................................................... 709/206
See application file for complete search history.

(56) References Cited

U.S. PATENT DOCUMENTS

| | | |
|---|---|---|
| 6,088,717 A | 7/2000 | Reed et al. |
| 6,201,814 B1 | 3/2001 | Greenspan |
| 6,484,196 B1 | 11/2002 | Maurille |

(Continued)

FOREIGN PATENT DOCUMENTS

WO    2005079023 A1    8/2005

OTHER PUBLICATIONS

Resnick et al.; "RFC 822"; Apr. 2001.*

(Continued)

*Primary Examiner* — Ryan Jakovac
(74) *Attorney, Agent, or Firm* — Ridout & Maybee LLP

(57) ABSTRACT

A method carried out by an electronic device enabled to send and receive electronic messages over a network, including: determining if a new electronic message received by the device is part of a message thread that includes the new message and at least one prior electronic message previously received at the device; and if the new message is determined to be part of a message thread, comparing address information of the new message with address information of the at least one prior electronic message in the message thread to determine if there has been a change in addressed recipients between the new message and the at least one prior electronic message, and if so, providing a notification to a user of the device of the existence of the change.

19 Claims, 7 Drawing Sheets

(51) Int. Cl.
*H04W 8/26* (2009.01)
*H04W 68/00* (2009.01)

(56) References Cited

U.S. PATENT DOCUMENTS

| | | |
|---|---|---|
| 6,671,718 B1 | 12/2003 | Meister et al. |
| 7,328,242 B1 * | 2/2008 | McCarthy et al. ........... 709/204 |
| 7,334,020 B2 | 2/2008 | Caughey |
| 7,814,155 B2 * | 10/2010 | Buchheit et al. ............. 709/206 |
| 2002/0023138 A1 | 2/2002 | Quine et al. |
| 2002/0099775 A1 | 7/2002 | Gupta et al. |
| 2002/0099777 A1 | 7/2002 | Gupta et al. |
| 2002/0194278 A1 | 12/2002 | Golan |
| 2003/0005058 A1 | 1/2003 | Sorotzkin |
| 2003/0120737 A1 | 6/2003 | Lytle et al. |
| 2003/0131060 A1 | 7/2003 | Hartselle et al. |
| 2004/0044735 A1 * | 3/2004 | Hoblit ........................... 709/206 |
| 2004/0059784 A1 * | 3/2004 | Caughey ....................... 709/206 |
| 2004/0103162 A1 | 5/2004 | Meister et al. |
| 2004/0254989 A1 | 12/2004 | Baratakke et al. |
| 2004/0260756 A1 * | 12/2004 | Forstall et al. ............... 709/200 |
| 2005/0117715 A1 | 6/2005 | Bordia |
| 2005/0132066 A1 | 6/2005 | Heilmann |
| 2005/0149621 A1 | 7/2005 | Kirkland et al. |
| 2005/0177621 A1 * | 8/2005 | Moody et al. ................ 709/206 |
| 2005/0188031 A1 | 8/2005 | Zandt |
| 2005/0198143 A1 | 9/2005 | Moody et al. |
| 2005/0223063 A1 * | 10/2005 | Chang et al. ................. 709/206 |
| 2005/0278430 A1 * | 12/2005 | Cato ............................. 709/206 |
| 2006/0161849 A1 * | 7/2006 | Miller et al. .................. 715/744 |
| 2006/0212522 A1 | 9/2006 | Walter et al. |
| 2006/0259557 A1 | 11/2006 | Lin et al. |
| 2007/0067394 A1 | 3/2007 | Adams et al. |
| 2007/0217408 A1 | 9/2007 | Sahashi et al. |
| 2007/0226204 A1 * | 9/2007 | Feldman ......................... 707/5 |

OTHER PUBLICATIONS

International Search Report and Written Opinion issued in connection with corresponding PCT application No. PCT/CA2006/001153.
International Search Report and Written Opinion issued in respect of PCT/CA2006/001153.
Extended European Search Report, regarding application No. 06761115.2, dated Aug. 17, 2009.
EPO, European Search Report for EP Application No. 05108546.2 dated Dec. 22, 2005.
USPTO Office Action relating to U.S. Appl. No. 11/227,607 dated Sep. 2, 2010.

* cited by examiner

ELECTRONIC MESSAGING CHANGED RECIPIENTS DETECTION AND NOTIFICATION

RELATED APPLICATIONS

This application claims priority to U.S. provisional patent Application Ser. No. 60/720,054 filed Sep. 26, 2005.

FIELD

Messaging applications that send and receive messages.

BACKGROUND

In the context of communications over the Internet, the term thread originally referred to a chain of postings on a single subject in a newsgroup. More recently however, the term thread has come to also mean a particular series (or set) of messages derived or continued on from an original message. One example of a common usage of the term thread is in the context of office communications where a set of these related messages may have been created, and then someone will forward the thread to a person not on the original distribution list with perhaps the top message stating, "be sure to follow this thread to get the background information on it."

It is possible that during a message thread additional recipients (previously absent from the thread) are added. It may not be clear to the other recipients that these additional recipients have been added. If so, unintended actions might end up being taken. For example, one of the message recipients might send out a reply containing information that he did not wish the additional recipients to see. Of course the additional recipients might not be internal recipients (i.e. people who work in the same company as the individuals who received the message that started the thread). Therefore one possible consequence of not being made aware of additional recipients might be the causing of a leak of confidential information.

Alternatively, sometimes during a message thread certain recipients are taken out of one or more of the most recent messages. Again it may not be clear to the other recipients that these recipients have been removed. Later, as additional messages are sent, there may be confusion as to why certain removed recipients never received particular messages intended to be sent to them.

Accordingly, it would be advantageous to improve methods and systems for detection and notification of a change in message recipients.

BRIEF DESCRIPTION OF THE DRAWINGS

Reference will now be made, by way of example, to the accompanying drawings which show example embodiments, and in which.

Similar reference numerals may have been used in different figures to denote similar components.

DESCRIPTION OF EXAMPLE EMBODIMENTS

Figure 1:
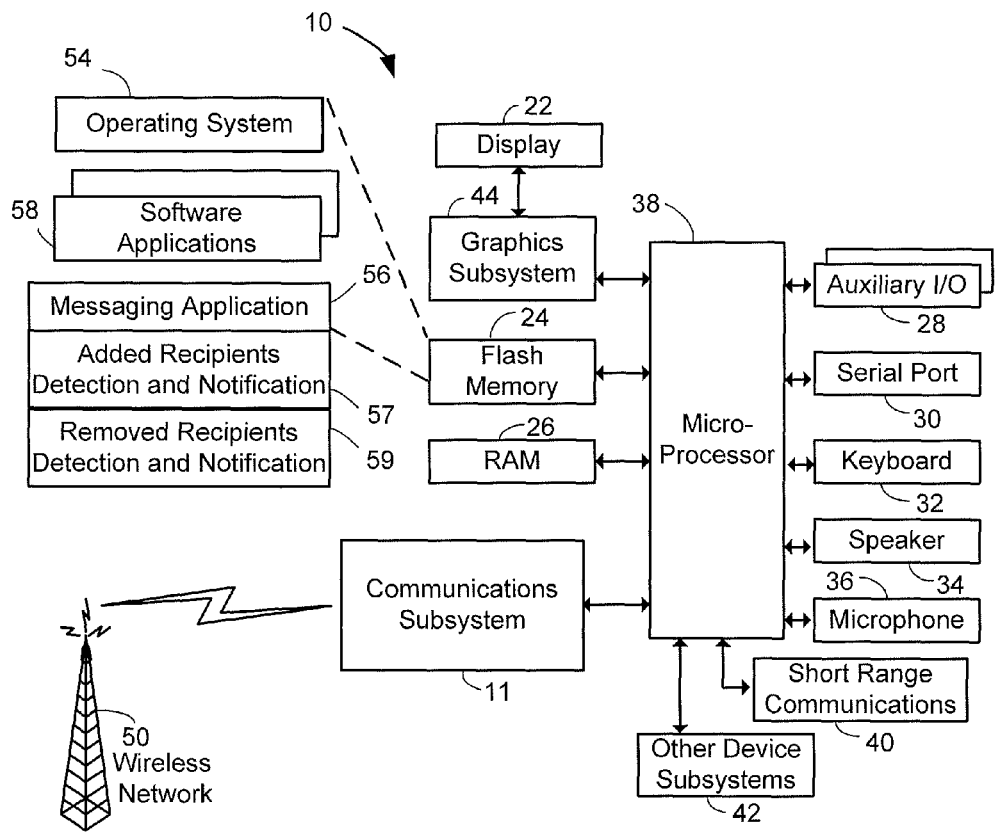
FIG. 1 shows a block diagram of an example of a user device to which example embodiments can be applied.

According to one example embodiment, there is an added recipient indication method carried out by a processing apparatus having a messaging application permitting a user to take actions in relation to messages. A set of the messages is identifiable as belonging to a common thread. Each of the messages has at least one recipient address and a date-time stamp. The method includes the steps of receiving a new message, which has recipient addresses and a date-time stamp and is identifiable as belonging to the thread, and detecting any added recipient addresses in the new message by comparing the recipient addresses of the new message to at least the recipient addresses of a most recent prior message belonging to the set of messages. If at least one added recipient address is detected, a notification of this is provided to the user at some moment in time after an inputted request from the user to display the new message is received.

According to another example embodiment, there is an electronic communications device that includes a display screen, a user input device, a communications system receiving over a communications network messages having at least one recipient address and a date-time stamp, a storage storing the messages received through the communications system and a messaging module. The messaging module (i) receives through the communications system a new message having recipient addresses and a date-time stamp, said new message identifiable as belonging to a common thread of messages; (ii) detects any added recipient addresses in said new message by comparing the recipient addresses of said new message to at least the recipient addresses of a most recent prior message belonging to the common thread of messages; and (iii) generates a user notification on said display screen that indicates detection of at least one added recipient address, said notification generated if any added recipient addresses have been detected in said new message.

According to yet another example embodiment, there is an added recipient indication method implemented in a message system. The system includes a messaging application permitting a user to take actions in relation to messages. A set of the messages is identifiable as belonging to a common thread. Each of the messages has at least one recipient address and a date-time stamp. The method includes the steps of receiving an inputted request from the user to display a selected message belonging to the set of the messages and detecting any added recipient addresses in the selected message, after the inputted request, by comparing the recipient addresses of the selected message to at least the recipient addresses of a most recent prior message belonging to the set of messages. If any added recipient addresses are detected, a notification of this is provided to the user.

According to another example embodiment, there is a method carried out by an electronic device enabled to send and receive electronic messages over a network, including: determining if a new electronic message received by the device is part of a message thread that includes the new message and at least one prior electronic message previously received at the device; and if the new message is determined to be part of a message thread, comparing address information of the new message with address information of the at least one prior electronic message in the message thread to determine if there has been a change in addressed recipients between the new message and the at least one prior electronic message, and if so, providing a notification to a user of the device of the existence of the change.

According to another example embodiment, there is a an electronic communications device including a display screen, an user input device, a communications system receiving over a communications network messages having at least one recipient address and a date-time stamp; a storage storing the messages received through the communications system; and a messaging module (i) receiving through the communications system a new electronic message having at least one recipient address and a date-time stamp, said new message identifiable as belonging to a common thread of messages; (ii) comparing recipient address information in the new message to recipient address information in at least one prior message in the common thread of messages to determine if there is a change in the addressed recipients between the new message and the at least one prior message and (iii) generating, if a change in the addressed recipients is detected, a user notification on the display screen that indicates a change in the addressed recipient has been detected.

The following description of example embodiments does not limit contemplated implementations to any particular computer programming language or system architecture. Changed recipients detection and notification in accordance with the disclosure is not limited to any particular operating system, mobile device architecture, or computer programming language. Moreover, although some of the embodiments described below include mobile devices, changed recipients detection and notification in accordance with the disclosure is not limited to mobile devices; rather, it may be embodied within a variety of user devices or terminals, including handheld devices, mobile telephones, personal digital assistants (PDAs), personal computers, audio-visual terminals, interactive television terminals, and other devices. One skilled in the art will appreciate that messaging applications can be installed on most of these user devices and terminals.

Any references herein to "messages" are not intended to be limited to e-mail, but should be understood to include other types of electronic messages that one skilled in the art would understand to be possible in the context in which the term is being used. Other types of messages include text messages, audio messages, video messages, and other items, including calendar entries, tasks, and other date-related items that can be sent to and received by addressed recipients.

Referring now to the drawings, FIG. 1 is a block diagram of a user device to which example embodiments can be applied. In at least one example, the user device is a two-way mobile communication device 10 having data and possibly also voice communication capabilities. In an example embodiment, the device 10 has the capability to communicate with other computer systems on the Internet. Depending on the functionality provided by the device 10, in various embodiments the device may be a data communication device, a multiple-mode communication device configured for both data and voice communication, a mobile telephone, a PDA enabled for wireless communication, or a computer system with a wireless modem, among other things.

In the illustrated embodiment, the device 10 includes a wireless communication subsystem 11 for exchanging messages with one or more communications networks 50. In one embodiment, the communication subsystem 11 may include a receiver, a transmitter, and associated components such as one or more, preferably embedded or internal, antenna elements, and a processing module such as a digital signal processor (DSP). As will be apparent to those skilled in the field of communications, the particular design of the communication subsystem 11 will be dependent in part upon the communication network(s) in which the device 10 is intended to operate.

The device 10 includes a microprocessor 38 that controls the overall operation of the device. The microprocessor 38 interacts with the communications subsystem 11 and also interacts with further device subsystems such as a graphics subsystem 44, flash memory 24, random access memory (RAM) 26, auxiliary input/output (I/O) subsystems 28, serial port 30, keyboard or keypad 32, speaker 34, microphone 36, a short-range communications subsystem 40, and any other device subsystems generally designated as 42. The graphics subsystem 44 interacts with the display 22 and renders graphics and/or text upon the display 22.

Operating system software 54 and various software applications 58 used by the microprocessor 38 are, in one example embodiment, stored in a persistent store such as flash memory 24 or similar storage element. Those skilled in the art will appreciate that the operating system 54, software applications 58, or parts thereof, may be temporarily loaded into a volatile store such as RAM 26. It is contemplated that received communication signals may also be stored to RAM 26.

The microprocessor 38, in addition to its operating system functions, can enable execution of software applications 58 on the device. A predetermined set of software applications 58 which control basic device operations, including data and voice communication applications for example, will normally be installed on the device 10 during manufacture. Further software applications 58 may also be loaded onto the device 10 through the network 50, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a data communication mode, a received signal such as a text message or web page download will be processed by the communication subsystem 11 and input to the microprocessor 38, which will preferably further process the received signal for output to the display 22 through the graphics subsystem 44, or alternatively to an auxiliary I/O device 28. A user of the device 10 may also compose data items within a software application 58, such as e-mail messages for example, using the keyboard 32 in conjunction with the display 22 and possibly an auxiliary I/O device 28 such as, for example, a thumbwheel. Such composed items may then be transmitted over a communication network through the communication subsystem 11.

The serial port 30, which may be a universal serial bus (USB) port, in FIG. 1 would normally be implemented in a personal digital assistant (PDA)-type communication device for which synchronization with a user's desktop computer (not shown) may be desirable, but is an optional device component. Such a port 30 would enable a user to set preferences through an external device or software application and would extend the capabilities of the device by providing for information or software downloads to the device 10 other than through a wireless communication network.

A short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices. The device 10 may be a handheld device.

Wireless mobile network 50 is, in an example embodiment, a wireless packet data network, (e.g. Mobitex™ or DataTAC™), which provides radio coverage to mobile devices 10. Wireless mobile network 50 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems). In some example embodiments, the network 50 is a wireless local area network (WLAN) operating, for example, in conformance with one or more IEEE 802.11 protocols. In some example embodiments, the device 10 is configured to communicate over both wireless wide area networks and wireless local area networks.

Figure 2:
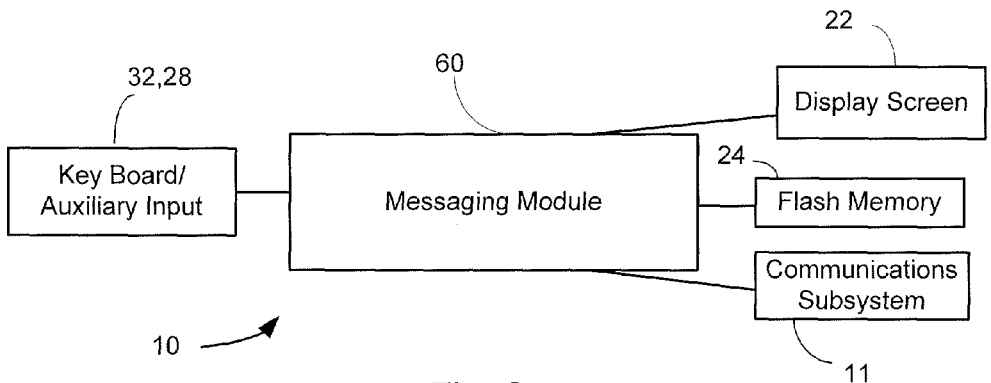
FIG. 2 shows a further block diagram representation of the user device of FIG. 1.

In one embodiment, the software resident on the device 10 includes a messaging application 56. Under instructions from the messaging application 56 resident on the device 10, the processor 38 is configured to implement a messaging module 60, represented in FIG. 2, for interacting with various device subsystems described above for permitting a user to take actions in relation to messages, and more specifically the user can send, receive and display messages or other items, such as tasks, calendar items, etc. In some embodiments, some or part of the functionality of the messaging module 300 can be implemented through firmware or hardware components instead of, or in combination with, computer software instructions executed by the microprocessor 38 (or other processors).

It is again noted that the present application is not limited to use in association with e-mail messages and may apply to other electronic messages where possible, including SMS messages, and other "items", including calendar entries, task list entries, and other items having a date-time stamp associated with them. References in the present application to "messages" or a "messaging application" should be understood to encompass and include possibilities within this wider range of items.

Figure 3:
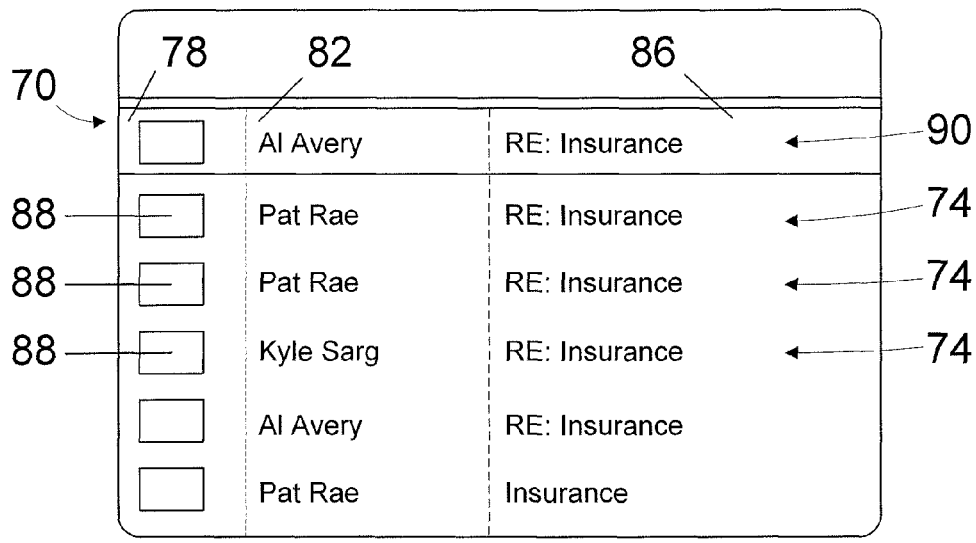
FIG. 3 shows, in diagrammatic form, a first user interface screen of a possible messaging application for the device of FIG. 1.

Referring to FIG. 3, a user interface screen 70 of an example embodiment of the messaging application 56 is illustrated. The user interface screen 70 corresponds to what the display of a mobile communication device might look like after the user has requested that the messaging application 56 display received messages in a list. This is typically done by clicking on an icon or a menu/list choice associated with a request to display inbox folder contents.

In the user interface screen 70, a plurality of messages 74 are listed vertically. Going from left to right in the user interface screen 70, there is a message icon column 78, a sender identifier column 82 and a message subject column 86. Icons 88 in the icon column 78 can provide information about the e-mails with which they are associated. For example, an icon 88 associated with an e-mail that has already been read can provide this information to the user by means of an appropriate graphical image displayed to the user (e.g. an envelope with its flap opened). Similarly an appropriate graphical image could be used for an e-mail that has not been read (e.g. an envelope with its flap closed). The columns 82 and 86 also provide information about the messages 74. In the column 82, the names of the people who sent the messages 74 are listed. In the column 86, the subject lines of the messages 74 are shown.

It will be understood that the display of the mobile communication device could show additional/fewer and/or different columns than those shown in FIG. 3. Some examples of alternative columns are importance, flag status, presence of attachment(s), received date, and message size. Due to the typical width of the display of a mobile communication device, it will normally not be desirable to have a large number of columns, and it will normally be desirable to show the columns that provide the most useful information keeping in mind that the user is probably looking for a particular message at the stage shown in FIG. 3.

Message 90 of the messages 74 has been highlighted by the user. The sender of the message 90 is "Al Avery", and the subject line of the message is "RE: Insurance". The user in this example now requests, using one or more of the input devices of his mobile communication device, that the message 90 be opened (i.e. the user inputs a request to have the message 90 displayed).

Figure 4:
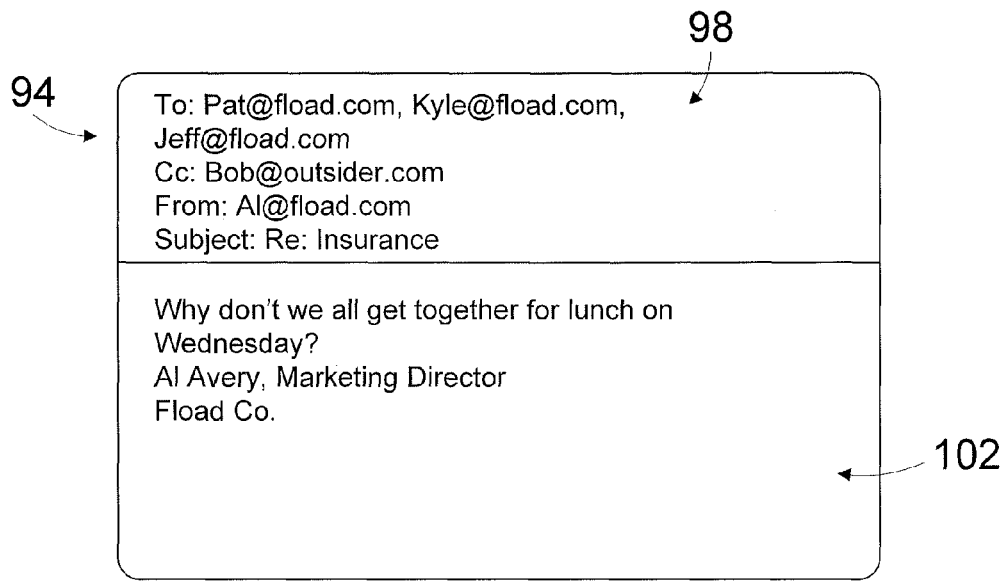
FIG. 4 shows, in diagrammatic form, a second user interface screen of the messaging application of FIG. 3, the second user interface screen being that of a displayed message.

FIG. 4 is a user interface screen 94 of the displayed message 90. Message header 98 contains various lines of information. The "From:" line contains the e-mail address of the message sender. The "To:" line contains the e-mail addresses of the individuals to whom the message has been sent. The "Cc:" line contains the e-mail address "Bob@outsider.com", and "Bob" is a person that has been Cc'd a copy of the e-mail. The "Subject:" line contains the subject of the e-mail (i.e. "RE: Insurance"). It will be understood that the header 98 could show additional/less and/or different information than what is shown. In addition, not all of the illustrated information lines would necessarily be displayed immediately. For example, the user might have to input a request to scroll up before all of the illustrated lines would appear on the display screen of the user's mobile communication device.

Below the header 98 is a message section 102 that contains the text of the message. Also, the section 102 is commonly referred to as the message body. As will be understood from reading the text contained in the message body 102, Al Avery has sent an invitation to Pat, Kyle, Jeff and Bob. More specifically, Al has invited all of these people to lunch on Wednesday. As sometimes happens in message threads, Al's e-mailed invitation may be off-topic (i.e. discussing lunch instead of "Insurance").

Figure 5:
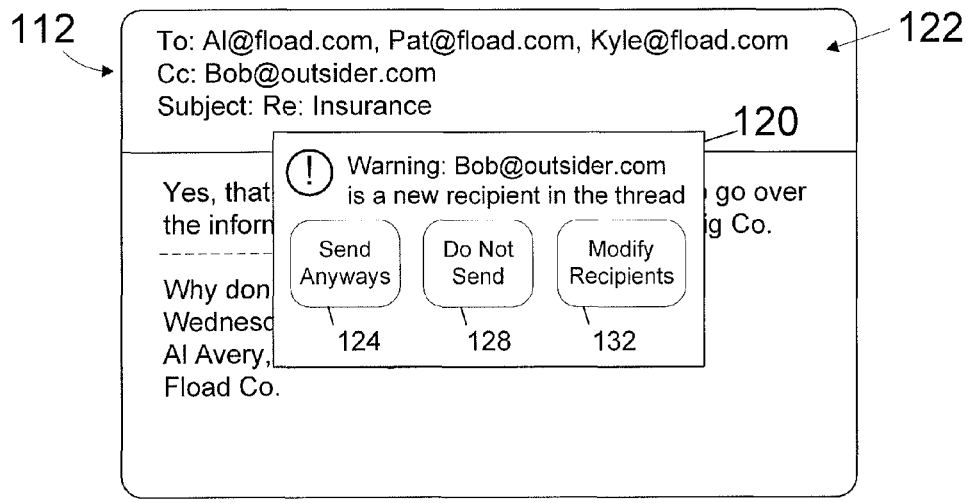
FIG. 5 shows, in diagrammatic form, a user interface screen generated after a person tries to send a reply-to-all message composition derived from the displayed message.

Still with reference to the example message from Al Avery, FIG. 5 is a user interface screen 112 illustrating a dialog window 120 superimposed over a reply-to-all message composition derived from the original message 90. The list of e-mail addresses to which the message composition is intended to be sent is contained in the "To:" line of header 122. Also, any e-mail addresses to which the message composition is intended to be "carbon copied" are contained in the "Cc:" line of the header 122. In this example, the original message sender and the other individuals to whom the original message was sent appear in the "To:" line. As in the original message, "Bob@outsider.com" appears in the "Cc:" line. This is usually what happens when a user makes a request to compose a reply-to-all message, as opposed to a request to compose a reply message where typically only the address of the original message sender will appear (in the "To:" line).

In this particular example, "Bob@outsider.com" happens to be an e-mail address that Al Avery newly introduced into the "Insurance" message thread by sending the e-mail 90. Thus when the user uses one or more of the input devices of his mobile communication device to submit a request to send the reply-to-all message composition, the dialog window 120 promptly appears to notify the user of the new recipient in the "Insurance" message thread. The user needs to select one of three presented options 124, 128 and 132, which are "Send Anyways", "Do Not Send" and "Modify Recipients".

It will be understood that the notification provided to the user need not indicate who are the new recipients in the thread. With reference to the dialog window 120, it could simply state "Warning: There is at least one new recipient in the thread", instead of the dialog window 120 stating "Warning: Bob@outsider.com is a new recipient in the thread". Also, instead of the dialog window 120 providing the user with three options, the options 124 and 128 (but not the option 132) could be provided. Furthermore, one skilled in the art will appreciate that there are other ways of providing a notification with accompanied selection options.

Also, the user need not be provided with selection options or be required to take action in relation to the notification. In one embodiment, notification is implemented by having a field at the beginning of the message body with one or more icons for indicating which recipients have been added. In addition, one or more of the various ways of notifying the user could be combined to better ensure that the user is notified.

Figure 6:
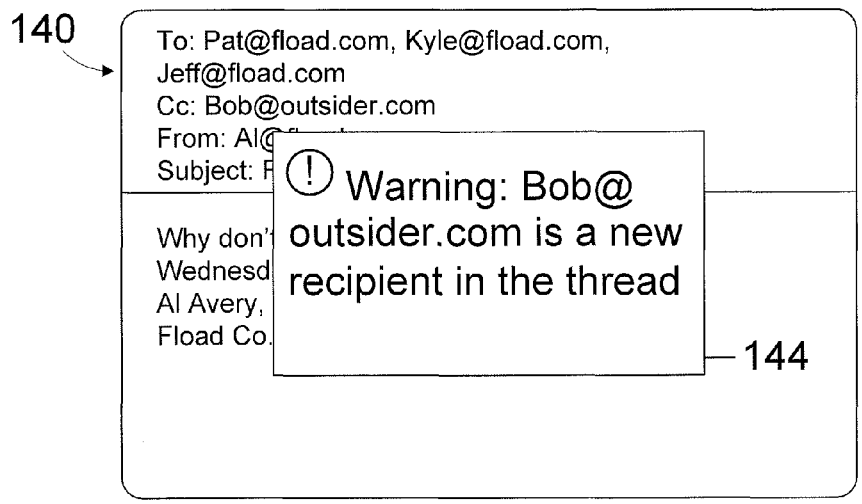
FIG. 6 shows, in diagrammatic form, another user interface screen illustrating notification in accordance with an alternative example embodiment.

FIG. 6 illustrates a user interface screen 140 similar to the user interface screen of FIG. 4, but in this user interface screen a dialog window 144 is superimposed over the displayed message 90. The user interface screen 140 relates to a changed recipient indication method in accordance with an alternative example embodiment. For the purposes of describing this alternative embodiment, reference again is made to FIG. 3 where the message 90 of the messages 74 has been highlighted by the user. Again the user in this example now requests, using one or more of the input devices of his mobile communication device, that the message 90 be opened (i.e. displayed). Promptly after making the request, not only is the message 90 displayed, but the dialog window 144 is superimposed over the displayed message. The dialog window 144 provides a notification to the user that "Bob@outsider.com" is a new recipient in the "Insurance" thread. In one embodiment, this notification is provided because the messaging application detected that the "Bob@outsider.com" e-mail address was newly introduced into the message thread by Al Avery when he sent the message 90.

Figure 7:
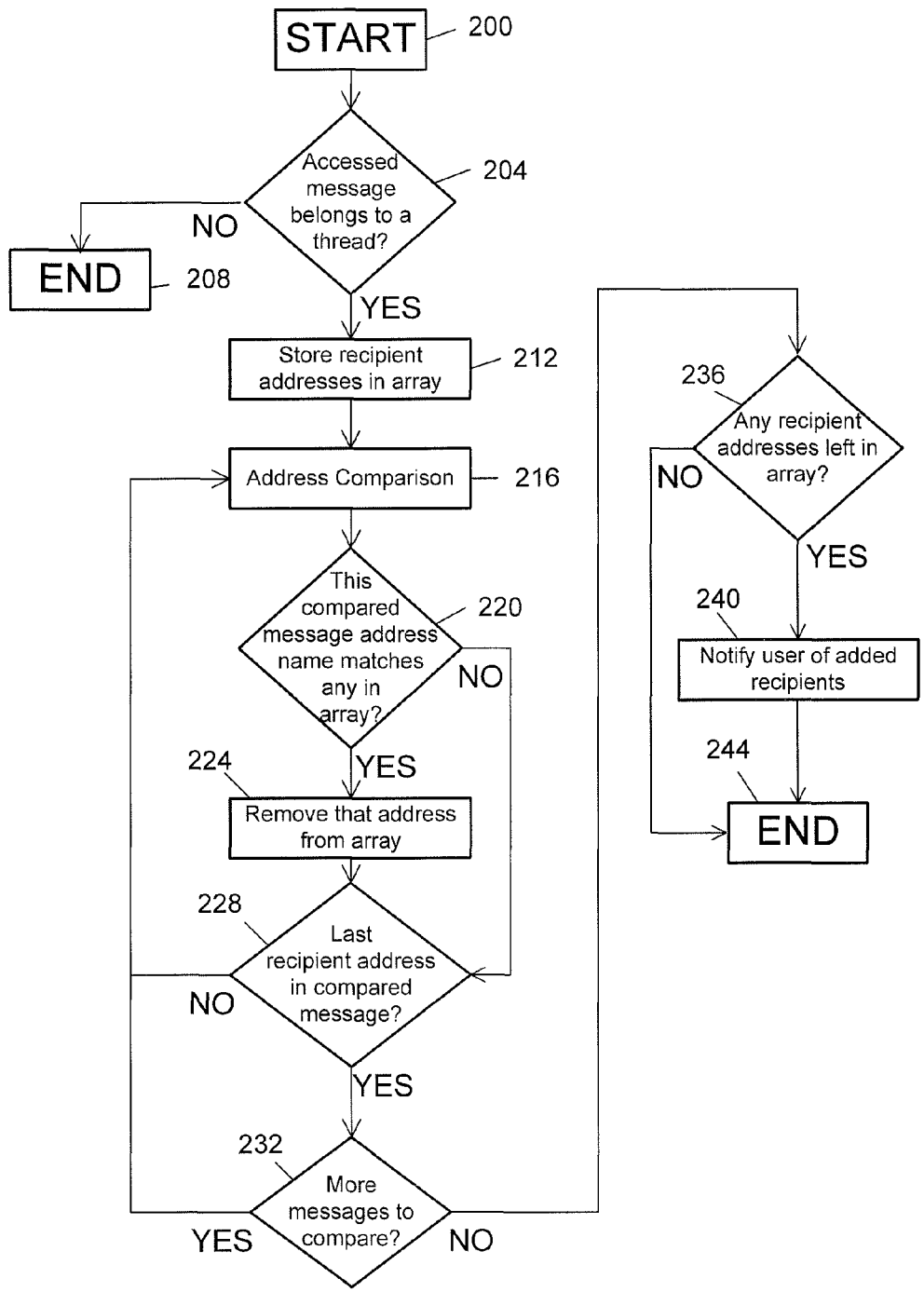
FIG. 7 shows, in flow chart form, an example embodiment of an added recipient indication method.

FIG. 7 is a flow chart further illustrating an added recipient indication method in accordance with an example embodiment. In at least one configuration, the method can be implemented through computer instructions embodied in an added recipients detection and notification module 57 stored on the device 10. In various example embodiments, the module 57 may be a subcomponent of the messaging application 56, or other applications 58, or may be a stand-alone application 57 that interacts with the messaging application 56.

The method starts at step 200, where the user inputs a request for an available message to be displayed to him. At decision step 204, the messaging application makes a determination as to whether the user-selected message (accessed message) belongs to a thread. It will be understood that there are different ways in which a set of messages can be identified as belonging to a common thread. In the case of e-mails contained in message folders (inbox folder, sent items folder, deleted items folder, etc.), the messaging application could look for matching subject lines of messages (ignoring any portions such as"Re:", "RE:", "Fw:", "FW:" at the beginning of any of the subject lines). Another way in which a set of messages could be identified as belonging to a common thread would be by use of a unique identifier present in each message belonging to the set. It will be understood that such an identifier need not be found in the subject line portion of the message. In some embodiments, the entire message thread can be contained in the e-mail body of the most recent email, and the messaging application may scan the content of the e-mail body for the addresses of one or more prior e-mails in the email body to detect changes in the recipients.

If the accessed message does not belong to a thread (i.e. it is a lone message) then the indication process ends at step 208 without the need to provide the user with any notification. If however the accessed message does belong to a thread, each different recipient address of the accessed message is stored in an array at step 212. After the step 212, the next stage in the illustrated method includes making recipient address comparisons against the recipient addresses of the most recent prior message belonging to the set of messages. It will be understood that the most recent prior message is identified by its date-time stamp (i.e. it is important that information about how old a particular message is be extractable from the message). At step 216, a first recipient address of the most recent prior message is compared against each of the addresses stored in the array. Next at step 220, a determination is made as to whether this first address matches any of the addresses stored in the array. If there is a match, the matching address is removed from the array at step 224 (so there is now one less address in the array), and the next step is decision step 228. If there is no match, then no action is taken in relation to the array, and the step 228 follows the step 220.

At the step 228, a check is done to determine whether or not there are any more recipient addresses left for comparison against the addresses stored in the array. If there are additional recipient addresses left for comparison, the steps 216 through 224 are repeated until there are no more addresses. Once this occurs, the next step is decision step 232. At this step, a determination is made as to whether there are any more older messages left for recipient address comparison. Also, it will be understood that in those cases where the messages are stored in folders, it will normally be desirable to process messages in not only the inbox folder, but in other folders as well. If there are additional older messages left in the message thread, the steps 216 through 228 are repeated until there are no more older messages. Once this occurs, the next step is decision step 236.

At the step 236, a check is done to determine whether or not there are any recipient addresses left in the array. If there are one or more recipient addresses left in the array, this means that the user selected message has at least one recipient previously absent from the message thread. In this case, the user is notified at step 240 that there are added recipients. The added recipient indication method then ends at step 244. In the case where there are no recipient addresses left in the array, no action is taken before the method ends at the step 244 because there is no need to provide the user with any notification.

It will be understood that the illustrated method could be modified so that steps are taken in a different order and/or different steps are taken without substantially changing the result. For example, the decision step 236 could be between the decision steps 228 and 232 instead of after the decision step 232. In this case, a check to see if there are any more recipient addresses left in the array would be done repeatedly every time before continuing to the next older message in the thread.

In an alternative added recipient indication method, the decision step 232 is omitted and the recipient addresses of the selected message are only compared to the recipient addresses of the most recent prior message. This avoids the need to scan all of the messages in the thread with the advantage that if one or more recipients are removed and then added again, the user will be notified.

In another alternative added recipient indication method, the steps 204 through 236 are performed on any received new messages, promptly after a new message is made available to the messaging application. In this way any added recipient addresses would normally be detected before an inputted request from the user to display the new message. One skilled in the art will appreciate that the results of the scanning could then be cached so that notification could be provided at some moment in time after the inputted user request to display the message without a scanning delay (associated with the method steps 204 through 236) then being experienced.

Figure 8:
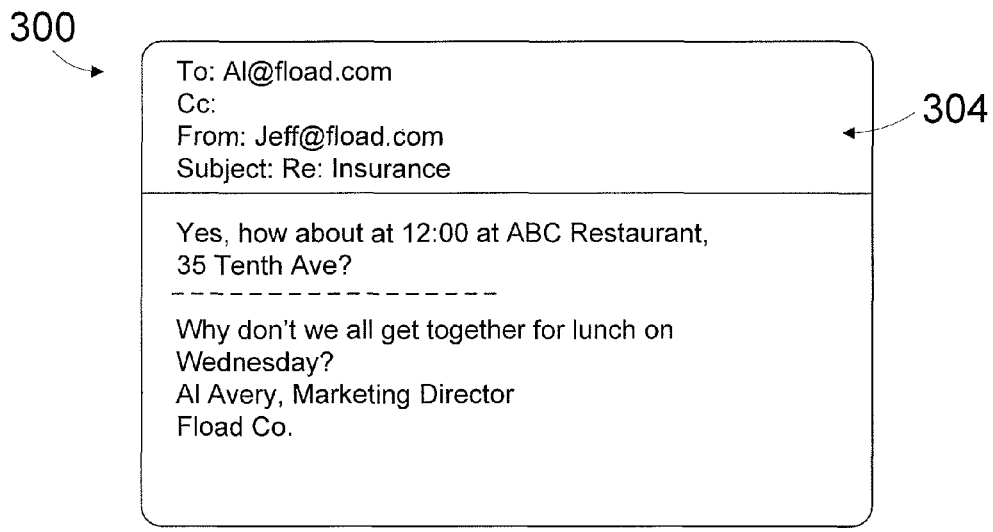
FIG. 8 shows, in diagrammatic form, another user interface screen of the messaging application of FIG. 3, this interface screen being that of another displayed message which is a reply to the message shown in FIG. 4.

Continuing with the "Insurance" message thread example, FIG. 8 is a user interface screen 300 of a displayed message, in particular a reply to the message shown in FIG. 4. Additionally, as can be determined from message header 304, "Jeff@fload.com" sent the illustrated message to "Al@fload.com". No other e-mail addresses besides "Al@fload.com" appear in the "To:" or the "Cc:" line of the message header 304. In other words, "Jeff@fload.com" only sent his reply to the question about the possibility of having lunch on Wednesday to "Al@fload.com". From the message header 304, it appears that others who received the previous message from "Al@fload.com" did not receive a copy of this message from "Jeff@fload.com". This may have been the result of the message sender (Jeff@fload.com) accidentally forgetting to have sent his message as a "reply-to-all" message instead of just a normal reply message, or it could have been for some deliberate reason.

Figure 9:
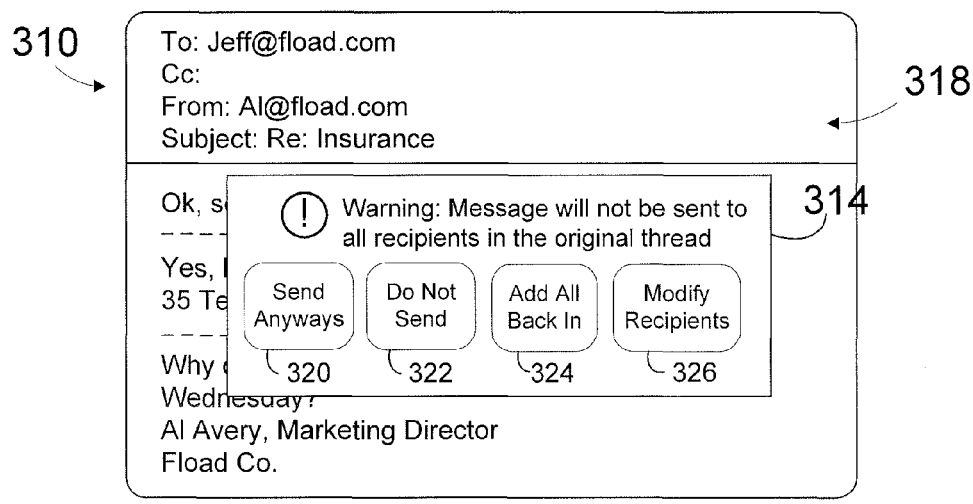
FIG. 9 shows, in diagrammatic form, a user interface screen generated after a person tries to send a reply-to-all message composition derived from the message shown in FIG. 8.

Still with reference to the example message from "Jeff@fload.com", FIG. 9 is a user interface screen 310 illustrating a dialog window 314 superimposed over a reply-to-all message composition derived by the messaging application on the device of Al@fload.com from the message shown in FIG. 8. In some embodiments, the dialog window 314 may be displayed right after user input of a desire to use the "reply-to-all" feature, or the dialog window 314 may be generated after the user has composed the reply message and provided a "send" message input to the device 10. From header 318 it will be seen that "Jeff@fload.com" is the only e-mail address in the "To:" line of the header 318, and that there are no e-mail addresses in the "Cc:" line of the header 318. Consequently, if transmitted in the illustrated state, the message would only be sent to "Jeff@fload.com".

In this particular example, a number of e-mail addresses that were included at a previous instance in time are no longer included because "Jeff@fload.com" removed those addresses when he composed and sent the message shown in FIG. 8. Thus in accordance with an example embodiment, when the user uses one or more of the input devices of his mobile communication device to submit a request to send the reply-to-all message composition, the dialog window 314 promptly appears to notify the user (in this case Al@flood.com) of removed recipients (those recipients who received previous messages in the thread but who were removed from the latest email) will not receive a copy of the message intended to be sent. The user needs to select one of four presented options 320, 322, 324 and 326, which are "Send Anyways", "Do Not Send", "Add All Back In" and "Modify Recipients".

It will be understood that the notification provided to the user could provide additional information besides notification of the fact that the message will not be sent to all recipients in the thread. For example, the notification could also list the e-mail addresses that were removed. Also, instead of the dialog window 314 providing the user with four options, fewer options could be provided. For example, the options 320, 322 and 326 (but not the option 324) could be provided. As another example, the options 320 and 322 (but not the options 324 and 326) could be provided. Furthermore, one skilled in the art will appreciate that there are other ways of providing a notification with accompanying selection options. In addition, it will be understood that the dialog box 314 could appear in connection with other types of message compositions besides reply-to-all compositions. For example, use in conjunction with reply-to-sender (only) and forward message compositions is contemplated.

Figure 10:
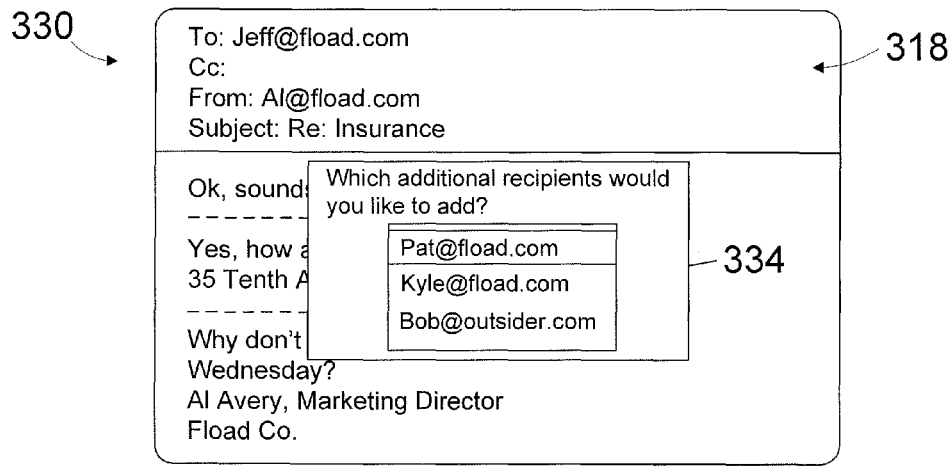
FIG. 10 shows, in diagrammatic form, a user interface screen generated after a person selects the "Modify Recipients" option from within the user interface screen shown in FIG. 9.

FIG. 10 shows a user interface screen 330 generated after a person selects the "Modify Recipients" option from within the user interface screen 310 shown in FIG. 9. The dialog box 334 lists missing recipients which can be selected for addition to the message composition, these missing recipients being: "Pat@fload.com", "Kyle@fload.com" and "Bob@outsider.com". It will be understood however that there are alternative possibilities for implementation of the option 326 ("Modify Recipients"). For example, selecting the option 326 could simply bring a cursor to the "To:" or "Cc:" line in the header 318. In the case where option 324 "Add All Back In" (instead of "Modify Recipients" option 326) is selected from dialog box 314, the messaging application just automatically populates the "to" (or CC) fields with the addresses of the missing recipients.

Figure 11:
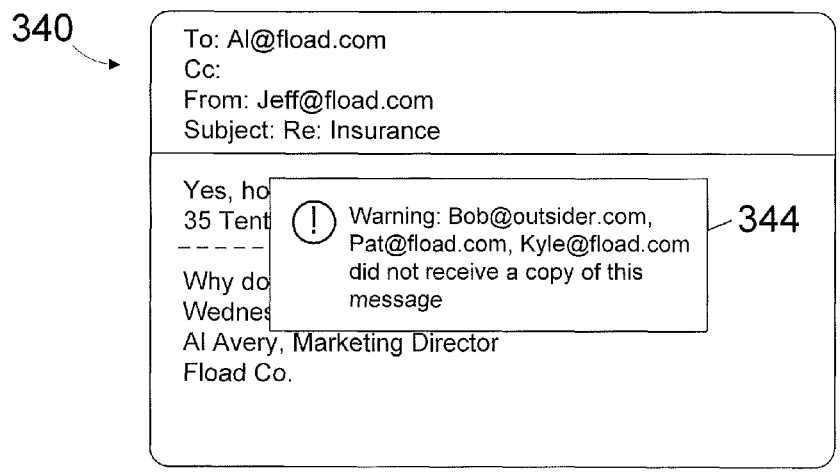
FIG. 11 shows, in diagrammatic form, another user interface screen illustrating notification in accordance with an alternative example embodiment.

FIG. 11 illustrates a user interface screen 340 similar to the user interface screen of FIG. 8, but in this user interface screen a dialog window 344 is superimposed over the displayed message. The user interface screen 340 relates to a changed recipient indication method in accordance with an alternative example embodiment. In a number of examples, a dialog window similar to the dialog window 344 appears promptly after making a request from a message list (like the one shown in FIG. 3) to open the message. The dialog window 344 provides a notification to the user that "Bob@outsider.com", "Pat@fload.com" and "Kyle@fload.com" (members of the message thread by virtue of the fact that they have received and/or sent at least one message belonging to the message thread) did not receive a copy of the message from "Jeff@fload.com". In one embodiment, this notification is provided because the messaging application detected that the above mentioned three e-mails were not maintained in the reply-to message composition of "Jeff@fload.com" that was derived from the message 90.

Figure 12:
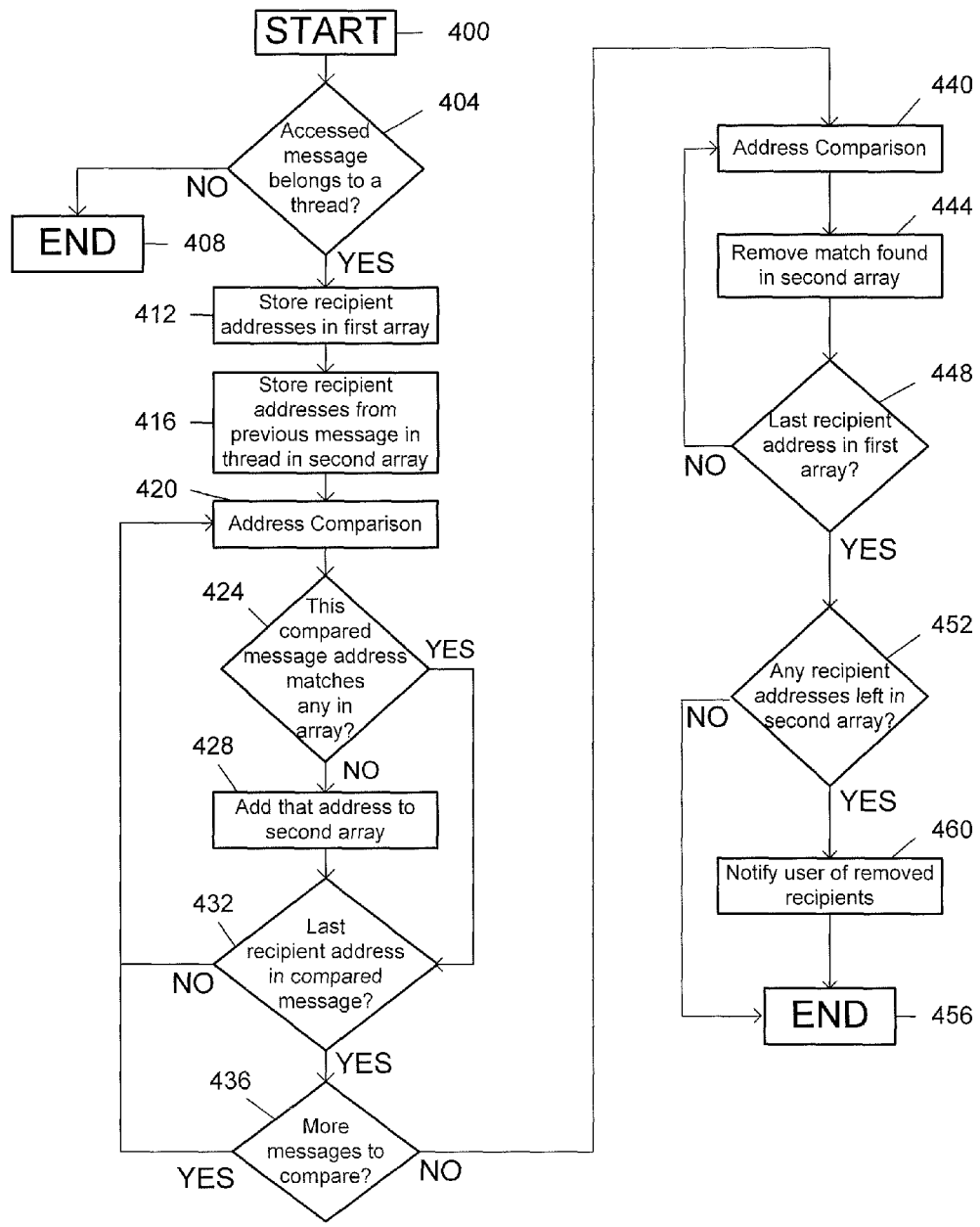
FIG. 12 shows, in flow chart form, an example embodiment of a removed recipient indication method.

FIG. 12 is a flow chart further illustrating the removed recipient indication method in accordance with an example embodiment. In at least one configuration, the method can be implemented through computer instructions embodied in a removed recipients detection and notification module 59 stored on the device 10 (FIG. 1). In various example embodiments, the module 59 may be a subcomponent of the messaging application 56, or other applications 58 or maybe a standalone application 59 interacts with the messaging application 56. The functionality of Added Recipients Detection and Notification Module 57 and Removed Recipients Detection and Notification Module 59 can be integrated into a single "Changed Recipients Detection and Notification Module".

The method starts at step 400, where the user inputs a request for an available message to be displayed to him. At decision step 404, the messaging application makes a determination as to whether the user-selected message (accessed message) belongs to a thread. Example ways in which this could be done have previously been discussed.

If the accessed message does not belong to a thread (i.e. it is a lone message) then the indication process ends at step 408 without the need to provide the user with any notification. If however the accessed message does belong to a thread, each different recipient address of the accessed message is stored in a first array at step 412. After the step 412, the next step in the illustrated method is storing the recipient addresses of the previous message in the thread in a second array (step 416). These initial recipient messages put into the second array provide a starting point for possibly determining additional members of the thread once even older messages are scanned. It will be appreciated that just by looking at the first previous message in the thread one may not obtain all of the members in the thread because, for instance, various recipients might have been added and removed at various points along the history of the message thread. Therefore, steps 420 through 436 are carried out to see if additional recipient addresses need to be added to the second array so that the second array stores as many of the thread recipient addresses as can be determined from processing the messages of the user's message account.

At step 420, a first recipient address of the next prior message is compared against each of the addresses stored in the second array. Next at step 424, a determination is made as to whether this first recipient address matches any of the addresses stored in the second array. If there is a match, then no action is taken in relation to the array, and decision step 432 follows the step 424. If there is no match, a new member in the thread has been found, so the recipient address is added to the second array (the array is now one element bigger than before). The step following the step 428 is the decision step 432.

At the step 432, a check is done to determine whether or not there are any more recipient addresses left for comparison against the addresses stored in the array. If there are additional recipient addresses left for comparison, the steps 420 through 428 are repeated until there are no more addresses. Once this occurs, the next step is decision step 436. At this step, a determination is made as to whether there are any more older messages left for recipient address comparison. Also, it will be understood that in those cases where the messages are stored in folders, it will normally be desirable to process messages not only in the inbox folder, but in other folders as well. If there are additional older messages left in the message thread, the steps 420 through 432 are repeated until there are no more older messages. Once this occurs, the next stage in the illustrated method is to determine what members in the second array are missing from the first array in order to determine thread members that are missing from the accessed message.

At step 440, each recipient address of the second array is compared against the first member of the first array to determine the member in the second array that is the same as the member in the first array being compared, so that that member can be removed from the second array, this removal occurring at step 444 (the subsequent step). Decision step 448 follows the step 444. At this step, a determination is made as to whether or not all of the recipient addresses in the first array have been processed. If this is not the case, then the steps 440 and 444 repeat until all the members of the first array have been removed from the second array. Once this is done, the next step is decision step 452. At the step 452, a determination is made as to whether or not there are any recipient addresses left in the second array. As discussed, these addresses would be thread member recipient addresses missing from the "To:" or "Cc:" lines of the message accessed at the start step 400. If there are no recipient addresses left in the second array, then the indication process ends at 456 without the need to provide the user with any notification. If however there are any recipient addresses left in the second array, step 460 follows the step 452, and the user is notified of there being missing thread members. In some embodiments, the user is notified immediately upon opening the message (such as shown in FIG. 11); in some embodiments, the user is given an additional notification such as shown in FIG. 9 when they start to compose a reply and/or send a reply (in some cases the notification may be limited only to when the user has selected "reply-to-all", but in some cases the notification can also be displayed where the user has selected only "reply", or in some cases "forward").

In an alternative removed recipient indication method, the steps 420 through 436 are omitted so that the step 440 immediately follows the step 416. This avoids the need to scan all of the messages in the thread, so that the recipient addresses of the message accessed in the step 400 are only compared against the first message preceding in time to that accessed message, and recipient addresses that were removed at a more previous point in the message thread would not be relevant.

In another alternative removed recipient indication method, the steps 404 through 452 are performed on any received messages, promptly after a new message is made available to the messaging application. In this way any removed recipient addresses would normally be detected before an inputted request from the user to display the new message. One skilled in the art will appreciate that the results of the scanning could then be cached so that notification could be provided at some moment in time after the inputted user request to display the message while avoiding a scanning delay associated with the method steps 404 through 452.

In some embodiments, the methods described above for detecting added recipients and removed recipients can both be performed and the user notified of both added recipients and removed recipients.

Certain adaptations and modifications of the described embodiments can be made. Therefore, the above discussed embodiments are considered to be illustrative and not restrictive.

What is claimed is:

1. An electronic communications device comprising:
    a display screen;
    a user input device;
    a communications system receiving over a communications network messages having at least one recipient address and a date-time stamp;
    a storage storing the messages received through the communications system; and
    a messaging module configured to:
        receive, through the communications system, a new message having recipient addresses and a date-time stamp, said new message identifiable as belonging to a common thread of messages;
        receive, through the user input device, a request to display said new message;
        responsive to receiving said request, compare the recipient addresses of said new message to at least the recipient addresses of a most recent prior message belonging to the common thread of messages to, thereby, detect an added recipient address;
        receive, through the user input device, a request to send a reply-to-all message composition derived from said new message; and
        responsive to receiving said request to send, generate a user notification message on said display screen that identifies said added recipient address, wherein said generating a user notification message comprises presenting additional information in a separate dialog window including a plurality of options, the dialog window superimposed over the reply-to-all message composition.

2. The communications device as claimed in claim 1, wherein said separate dialog window identifies said added recipient address.

3. An added recipient indication method carried out by a message system, the system including a messaging application permitting a user to take actions in relation to messages, a set of said messages identifiable as belonging to a common thread and each of the messages having at least one recipient address and a date-time stamp, the method comprising:
    receiving a new message having recipient addresses and a date-time stamp, said new message identifiable as belonging to the common thread of messages;
    receiving a request to display a said new message;
    responsive to said receiving said request, comparing the recipient addresses of said new message to at least the recipient addresses of a most recent prior message belonging to said set of messages;
    detecting, based on said comparing, an added recipient address in said new message;
    receiving a request to send a reply-to-all message derived from said new message; and
    responsive to said receiving said request to send, providing a notification message of said added recipient address, wherein said generating a notification message comprises presenting additional information in a separate dialog window including a plurality of options, the dialog window superimposed over the reply-to-all message composition.

4. The method as claimed in claim 3, wherein the comparing comprises comparing the recipient addresses of said new message only to the recipient addresses of said most recent prior message.

5. The method as claimed in claim 3, wherein the comparing comprises comparing the recipient addresses of said new message to the at least one recipient address of all messages in said set of messages.

6. A method carried out by an electronic device enabled to send and receive electronic messages over a network, comprising:
    determining that a new electronic message received by the device is part of a message thread that includes the new message and at least one prior electronic message previously received at the device;
    receiving a request to display said new message;
    responsive to said receiving said request, detecting, based on comparing recipient addresses of the new message with recipient addresses of the at least one prior electronic message in the message thread, that there has been a change in addressed recipients between the new message and the at least one prior electronic message;
    receiving a request to send a reply-to-all message derived from the new message; and
    responsive to the receiving the request to send, providing a notification message of the existence of the change in addressed recipients, wherein said providing a notification message comprises presenting additional information in a separate dialog window including a plurality of options including an option for modifying recipient addresses of the reply-to-all message to change the addressed recipients thereof.

7. The method of claim 6 wherein, before the comparing the recipient addresses of the new message with the recipient addresses of the at least one prior electronic message, the method further comprises receiving a request to display the new message.

8. The method of claim 6 wherein the dialog window includes information identifying recipients that have been added to, or deleted from, the addressed recipients of the new message compared to the at least one prior message.

9. The method of claim 6 wherein the message thread includes at least two prior electronic messages previously received at the device, and wherein the comparing comprises comparing only the recipient addresses of the most recent of the prior electronic messages in the message thread with the recipient addresses of the new electronic message to determine if there has been any change in addressed recipients.

10. The method of claim 6 wherein the message thread includes at least two prior electronic messages previously received at the device, and wherein the comparing comprises comparing the recipient addresses of all of the prior electronic messages in the message thread with the recipient addresses of the new electronic message to determine if there has been any change in addressed recipients.

11. The method of claim 6 wherein the determining if the new electronic message received by the device is part of a message thread comprises comparing content of a subject line of the new electronic message with content of subject lines of the at least one prior electronic message previously received at the device.

12. The method of claim 6 wherein previous electronic messages in a message thread are included in a body of subsequent electronic messages in a message thread.

13. The method of claim 6 wherein the comparing the recipient addresses of the new message with recipient addresses of the at least one prior electronic message in the message thread comprises determining that a new recipient addresses has been added to the new message relative to the at least one prior electronic message.

14. The method of claim 6 wherein the comparing the recipient addresses of the new message with recipient addresses of the at least one prior electronic message in the message thread comprises determining that a recipient address has been deleted from the new message relative to the at least one prior electronic message.

15. A non-transitory computer program product comprising a computer readable storage medium carrying program code that, when executed by a processor of a device, causes the processor to:
   determine that a new electronic message received by the device is part of a message thread that includes the new message and at least one prior electronic message previously received at the device;
   receive a request to display said new message;
   responsive to receiving said request, detect, based on comparing recipient addresses of the new message with recipient addresses of the at least one prior electronic message in the message thread, that there has been a change in addressed recipients between the new message and the at least one prior electronic message;
   receive a request to send a reply-to-all message derived from the new message; and
   provide a notification message of the existence of the change in addressed recipients, wherein said providing a notification message comprises presenting additional information in a separate dialog window including a plurality of options including an option for modifying recipient addresses of the reply-to-all message to change the addressed recipients thereof.

16. An electronic communications device comprising:
   a display screen;
   a user input device;
   a communications system receiving over a communications network messages having at least one recipient address and a date-time stamp;
   a storage storing the messages received through the communications system; and
   a messaging module configured to:
      receive, through the communications system, a new electronic message having at least one recipient address and a date-time stamp, said new message identifiable as belonging to a common thread of messages;
      receive a request to display said new message;
      compare, responsive to receiving the request to display, recipient address information in the new message to recipient address information in at least one prior message in the common thread of messages to determine that there is a change in the addressed recipients between the new message and the at least one prior message;
      receive, through the user input device, a request to send a reply-to-all message composition derived from said new message; and
      generate, responsive to receiving the request to send, a separate user notification dialog window on the display screen that indicates the change in the addressed recipients has been detected, wherein said separate user notification dialog window includes a plurality of options including an option for modifying recipient addresses of the reply-to-all message to change the addressed recipients thereof.

17. The communications device as claimed in claim 16, wherein the messaging module, when comparing the recipient address information in the new message to the recipient address information in at least one prior message in the common thread of messages detects if any recipient addresses have been deleted from the recipient address information of the new message.

18. The communications device as claimed in claim 16, wherein the messaging module, when comparing the recipient address information in the new message to the recipient address information in at least one prior message in the common thread of messages detects if any recipient addressed have been added to the recipient address information of the new message.

19. The communication device as claimed in claim 16 wherein the device is a mobile hand-held device.

* * * * *